A. F. RICHTER & T. L. DUNBAR.
SO₂ GAS AND LIQUID RECLAIMER.
APPLICATION FILED JULY 11, 1914.

1,213,414.

Patented Jan. 23, 1917.

Witnesses

A. F. Richter and
T. L. Dunbar Inventors by C. A. Snow & Co.
Attorneys

UNITED STATES PATENT OFFICE.

AUGUST F. RICHTER, OF WATERTOWN, AND THOMAS L. DUNBAR, OF POTSDAM, NEW YORK.

SO₂ GAS AND LIQUID RECLAIMER.

1,213,414.  Specification of Letters Patent.  Patented Jan. 23, 1917.

Application filed July 11, 1914. Serial No. 850,434.

*To all whom it may concern:*

Be it known that we, AUGUST F. RICHTER and THOMAS L. DUNBAR, citizens of the United States, residing, respectively, at Watertown and Potsdam, in the counties of Jefferson and St. Lawrence, State of New York, have invented a new and useful SO₂ Gas and Liquid Reclaimer, of which the following is a specification.

In this application there is disclosed a novel process and a novel apparatus for reclaiming or salvaging the liquid and gaseous products proceeding from a digester in the sulfite process.

One object of the present invention is to provide a process and an apparatus in which the liquid and gas proceeding from the digester are cooled and subsequently separated, the gas thus separated being cooled a second time before it is permitted to mingle with fresh liquor in the sulfite liquor tank, the liquid from the digester being conveyed directly into the said tank.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
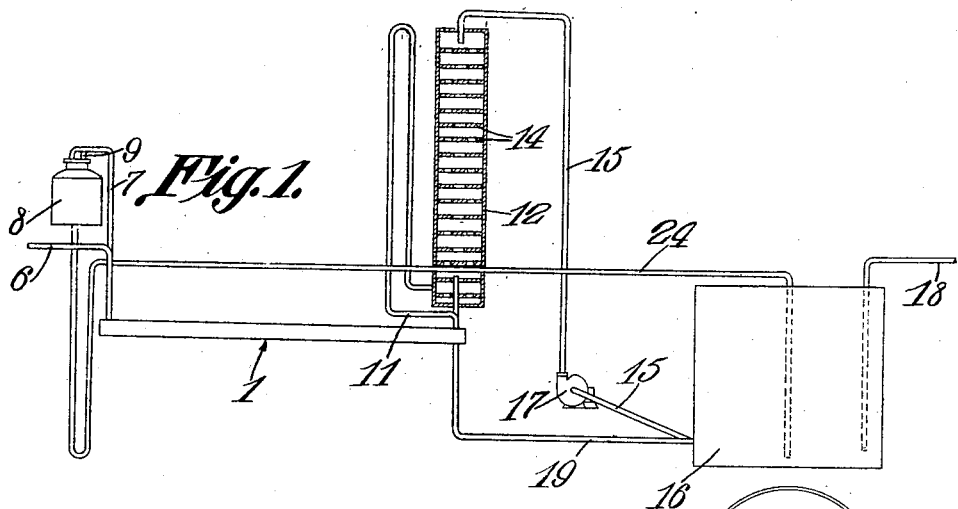
Figure 2:
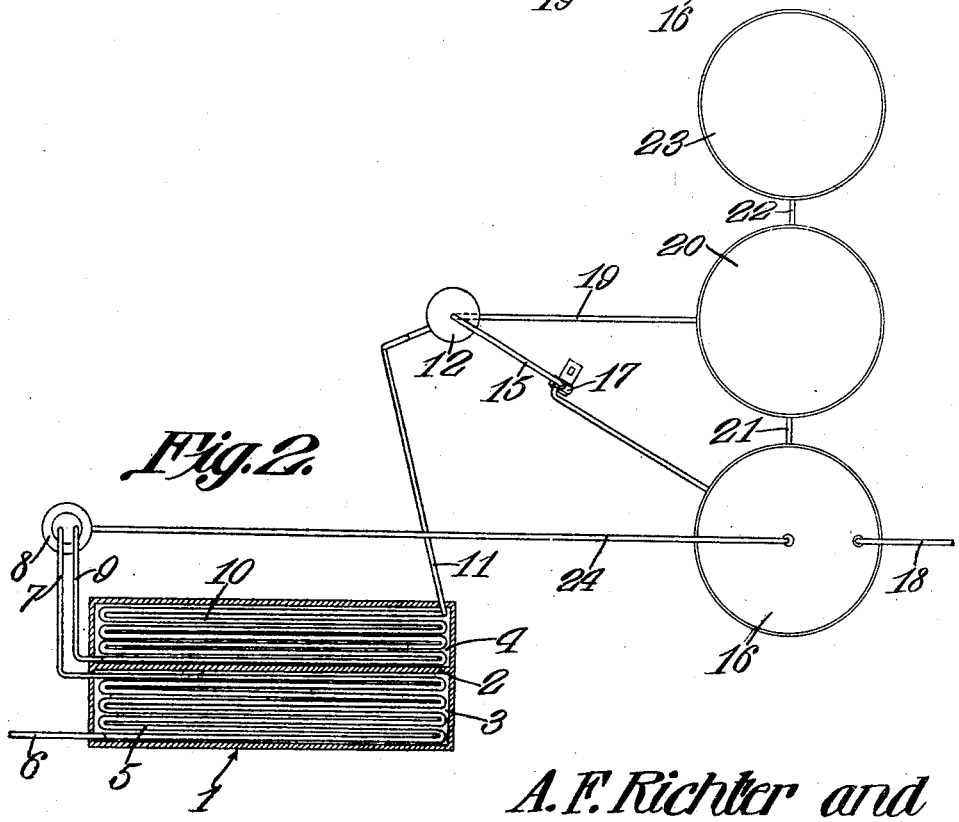

In the accompanying drawing:—Figure 1 shows in diagrammatic side elevation, one form of apparatus adapted to be used in carrying out the process contemplated herein, parts being sectioned; Fig. 2 is a diagrammatic top plan of the structure shown in Fig. 1, parts being sectioned.

In the accompanying drawings, the numeral 1 indicates a cooling means of any desired sort, the same being shown in the form of a tank divided by means of a partition 2 into compartments 3 and 4. Located in the compartment 3 is a pipe coil 5, one end 6 of which communicates with the digester (not shown). The other end 7 of the coil 5 enters a separator 8. Entering the separator 8 is a pipe 9 communicating with one end of a coil 10 located in the compartment 4, the coils 5 and 10 being cooled by water in the tank 1, or in any other suitable manner; and, indeed, the cooling means, so far as its specific construction is concerned, may be changed greatly without jeopardizing the utility of the apparatus or the efficiency of the process.

A pipe 11 forms a communication between one end of the cooling coil 10 and the bottom portion of a sulfur dioxid gas reclaiming tower 12 in which are located baffle plates 14. A pipe 15 enters the top of the sulfur dioxid gas reclaiming tower 12 and communicates with a sulfite liquor storage tank 16, there being a pump 17 interposed in the pipe 15. Fresh sulfite liquor is supplied to the tank 16 by means of a pipe 18. A pipe 19 leads from the bottom of the sulfur dioxid gas reclaiming tower 12 to a sulfite liquor tank 20 communicating as indicated at 21 with the tank 16. The tank 20 is united by a connection 22 with a tank 23, the latter acting merely as an overflow tank. From the separator 8 a pipe 24 leads to the tank 16.

In practical operation the gaseous and liquid products emerging from the digester pass through the pipe 6 into the cooling coil 5 and from the coil 5, the gaseous and liquid products pass by way of the pipe 7 into the separator 8. At this point it is to be noted that the gaseous and liquid products are cooled before they pass into the separator 8.

In the separator 8, the gaseous and liquid products are disassociated from each other, the liquid passing by way of the pipe 24 into the tank 16.

From the separator 8, the gas passes by way of the pipe 9 into the coil 10 and from the coil 10 by way of the pipe 11 into the sulfur dioxid gas reclaiming tower 12. Liquid is drawn from the tank 16 through the pipe 15 by means of the pump 17 and this liquid, as it traverses the baffle plates 14 in the sulfur dioxid gas reclaiming tower 12 mingles with the cooled gas introduced by the pipe 11. The resultant liquid is returned to the tank 20 by way of the pipe 19.

It is to be observed that the liquid and gaseous products proceeding from the digester are cooled by the coil 5 before they enter the separator 8. As a consequence, the separation is more perfect by reason of condensation having been effected, producing a rich sulfur dioxid gas. Owing to the fact that the liquid from the separator 8 is delivered through the pipe 24 into the tank 16, the sulfur dioxid and lime compound in the tank is changed and a liquid is produced which is extremely efficient and active. This liquid passes through the sulfur dioxid gas reclaiming tower 12 and comes in contact with the aforesaid rich sulfur dioxid gas, which is thereby absorbed.

It is to be observed that after the gas has been separated from the liquid by the action of the separator 8 and before the gas passes into the sulfur dioxid gas reclaiming tower 12, the gas is given a second cooling in the coil 10. Owing to this fact, the gas is readily and instantly absorbed in the sulfur dioxid gas reclaiming tower 12 by the liquid traversing the pipe 15.

Although the process and the apparatus herein disclosed may be applied to any system of sulfite liquor making with efficient results, the same are peculiarly efficient for use in connection with plants making liquor by the milk of lime process.

Having thus described the invention, what is claimed is:—

1. A salvaging step in a sulfite process, which consists in first cooling the combined liquid and gaseous products from a digester, then effecting a separation of the liquid and gaseous products from each other, subjecting the gas obtained by the separation to the action of a cooling medium the temperature of which differs from that of the atmosphere, mingling the liquid obtained by the separation with fresh liquor, and mingling the mixture of fresh liquor and liquid with the gas after the latter has been cooled.

2. A salvaging apparatus for use in a sulfite process and comprising a cooler for liquid and gaseous digester-products; a separator into which the cooler discharges; a liquor-storage; a second cooler for the gas from the separator; a connection between the separator and the second cooler; a liquid conduit leading from the separator to the liquor-storage; a sulfur-dioxid reclaiming-tower; a gas-conveying connection between the second cooler and the lower portion of the tower; a liquor-delivery conduit leading from the liquor-storage to the upper portion of the tower; means interposed in the last-specified conduit for enhancing the flow of liquor from the liquor-storage to the tower; and a return conduit leading from the lower portion of the tower to the liquor-storage.

3. A salvaging apparatus for use in a sulfite process and comprising a cooler; a separator into which the cooler discharges; a liquor-storage; a liquid conduit leading from the separator to the liquor-storage; a sulfur-dioxid reclaiming-tower; means for conveying gas from the separator to the bottom of the tower; a liquor-delivery conduit leading from the liquor-storage to the top of the tower; a return-conduit leading from the bottom of the tower to the liquor-storage; and means for producing a flow through a circuit comprising the liquor-storage, the delivery-conduit, the tower and the return-conduit.

In testimony that we claim the foregoing as our own, we have hereto affixed our signatures in the presence of two witnesses.

AUGUST F. RICHTER.
THOS. L. DUNBAR.

Witnesses to the signature of August F. Richter:
GEORGE A. STEBBINS,
F. E. KENNEDY.

Witnesses to the signature of Thomas L. Dunbar:
W. J. PALMER,
GEORGE SEALEY.